United States Patent Office 3,296,129
Patented Jan. 3, 1967

3,296,129
METHOD OF FORMING STABLE EMULSIONS
John R. Scheidker, Grand Rapids, Mich., and Ford C. Teeter, Palos Heights, Ill., assignors to Sinclair Research, Inc., New York, N.Y., a corporation of Delaware
No Drawing. Filed Sept. 3, 1963, Ser. No. 306,274
5 Claims. (Cl. 252—33.4)

This invention relates to the formulation of soluble oil emulsions and concerns particularly an improved method for preparing emulsifying cutting oil compositions.

Soluble oils usually consist essentially of a base oil which is generally a mineral lubricating oil, a soap as an emulsifying agent and a coupling agent to improve emulsifiability; the aforesaid ingredients often being employed in rather well-defined proportionate amounts so that, when the soluble oil is incorporated into relatively large amounts of water, a stable emulsion or dispersion results that is suitable for use as a lubricant and coolant in metal cutting and other machining operations. In the production of emulsified soluble oils known to the art, difficulties have been encountered in obtaining stable compositions having the desired properties and such difficulties have especially been encountered when attempts are made to form a stable emulsion of the oil and relatively large amounts of water having a low temperature, i.e. up to about 50° F., and hardness of at least about 100 p.p.m. as $CaCO_3$.

The base soluble oil, i.e. the mineral oil with the additives, often contains a minor amount, e.g. up to about 6%, preferably about 0.5 to 5%, by weight of water which is distinguished from the large amount of water added to the soluble oil to form a working emulsion. Water present in the base soluble oil will hereinafter be referred to as stabilizing water and water added to the soluble oil to form a working emulsion will be referred to as emulsification water. It is known that when the emulsification water, especially at a temperature of about 50° F. or below and having a hardness of about 100 p.p.m. to 600 p.p.m. as $CaCO_3$, is added to the soluble oil, "creaming" or breaking of the emulsion may occur which results generally in a flammable oil layer and an aqueous layer lacking in lubricity. These results are distressing since it is both economic and convenient to employ this type of emulsification water in certain geographical areas and seasons of the year. Various attempts have been made to formulate a stable emulsion employing such low temperature, hard emulsification water but these attempts usually have either been unsuccessful or have involved the addition of, for instance, increased amounts of coupling agents or emulsification additives which significantly increase the cost of producing the emulsified composition.

It has now been found that a stable working emulsion of a soluble oil whose composition includes a major amount of mineral lubricating oil, and minor amounts of an oil-soluble emulsifying agent and an aliphatic alcoholic compound as a coupling agent, can be easily prepared by formulating a water-augmented blend of the soluble oil prior to the addition of emulsification water even if the latter is hard water having a low temperature. The water added to the soluble oil to prepare this augmented blend, that is the augmentation water, is therefore to be distinguished from both the stabilizing water and the emulsification water defined above. The soluble oil augmented blend of this invention thus comprises a soluble oil having incorporated therein a sufficient amount of water to yield a stable emulsion when admixed with emulsification water even when the emulsification water is at a temperature of about 50° F. or below and when the water exhibits a hardness greater than about 100 p.p.m. as $CaCO_3$. The amount of augmentation water added to the soluble oil to produce a blend is generally about 0.4 to 3 parts per part of soluble oil or about 30 to 75, preferably about 50, volume percent of the augmented blend. The augmentation water may be distilled water or water having up to about 600 p.p.m., preferably up to 300 p.p.m., as $CaCO_3$ hardness and generally its temperature is at least about 60° F., say for instance about 60 to 100° F., depending often on the particular soluble oil chosen, the temperature of the emulsification water and the weight percent emulsion desired.

The soluble oils whose emulsification properties are improved in accordance with the present invention are those exhibiting poor or inadequate emulsification characteristics in cold, hard water due to the composition or amounts of the additives such as emulsifying agents, coupling agents, etc. in the oil. The mineral lubricating oil employed as a base and major component, e.g. it is present in amounts generally about 60 to 98% by weight, of the soluble oil composition, includes a wide variety of refined lubricating oils such as oils which can be manufactured by solvent treating, acid treating, etc., of various crude oils, such as paraffinic, naphthenic, or mixed base crude oils. The mineral oil component is generally a medium viscosity petroleum lubricating oil. This type of oil includes those having various geographical origins such as Pennsylvania, Gulf Coast and California. Although most oils may be used as the mineral lubricating constituent, Gulf Coastal oils are particularly acceptable. Further any oil of lubricating viscosity can be used in the process but it is preferred to use a substantially anhydrous lubricating oil with a viscosity SUS at 100° F. of from about 50 to 1200, preferably about 50 to 150 SUS at 100° F.

The amount of emulsifier in the soluble oil generally will be between about 2 to 30%, preferably 6 to 25%, based on the weight of the soluble oil. Preferably, the emulsifier in the soluble oil is an oil-soluble aromatic sulfonate which includes ammonium, alkali and alkaline earth metal aromatic sulfonates wherein the sulfonic acids from which the salts are derived have an average molecular weight ranging from about 400 to 700, usually having a spectrum of sulfonates of different molecular weights but essentially free of water-soluble sulfonic acids and sulfonic acids of molecular weights materially exceeding about 700. It is preferred that the average molecular weight of the sulfonic acids used in the formation of the sulfonates be from about 400 to 500. The sulfonates used herein include the salts of synthetic sulfonic acids and petroleum mahogany sulfonic acids; and these may be exemplified by ammonium mahogany sulfonates, calcium dipropylene benzene sulfonate, calcium mahogany petroleum sulfonates, calcium dinonyl naphthalene sulfonate, calcium didodecylbenzene sulfonate, sodium mahogany sulfonates, etc. Although the aromatic sulfonates are preferred the oil-soluble emulsifier used in the soluble oils of this invention may be, for instance, saponified phenols or naphthenic acids, alkali metal, e.g. sodium and potassium, rosin and resin acid soaps, amine salts of rosin acids, etc.

It has also been found advantageous to include a minor amount of sodium lauroyl sarcosine in the aromatic sulfonate-containing soluble oil, especially when hard water, i.e. water having a hardness of at least about 250 p.p.m. as $CaCO_3$, is employed as the augmentation water. The sarcosine is generally used in about a thirty percent aqueous solution and conveniently may be added to the augmented blend in amounts of about 1 to 4 weight percent, dry basis.

In addition to the emulsifier, a coupling agent is generally provided in the soluble oil to improve the emulsifiability of the various components, i.e. to couple the aqueous portion of the compounded neat soluble oil to the continuous oil phase to give a clear product and also couple the seat oil to diluent water added to provide the emulsified soluble oil for use. Among the well known coupling agents useable in the composition are the aliphatic alcohols, including the mono and dihydroxy alcohols, particularly hydrocarbyl glycols and alkyl ether-alkanols, containing up to about 12 or even 30 carbon atoms, for instance, the mono- and dihydroxy alkyl ethers and glycols such as diethylene glycol, hexylene glycol, ethyl Cellosolve, carbitol, butyl Cellosolve; and other polyether glycols with or without terminal ether groups. One or more of the above coupling agents can be used either alone or in mixtures and in various amounts generally about 0.5 to 10%, or more, preferably about 1 to 5%, by weight of the soluble oil.

Other additives may also be incorporated in the soluble oil compositions. For instance, corrosion inhibitors such as alcohol amines including triethanol amine, 2-amino-2-ethyl-1,3-propanediol; tertiary amines such as tri-n-butyl amine or a nitrile of an alkali metal salt as sodium nitrate. Secondary or auxiliary emulsifying agents may also be incorporated in the soluble oil composition such as alkali metal rosinates in amounts up to about 10% or more by weight, generally about 3 to 6% by weight. When employing a bactericide, tetrachlorophenol may be used although other compatible bactericides can be present, for instance, phenylmercuric acetate, and orthophenyl phenol. Moreover, they can be used either alone or in combination in an amount of about 0.5 to 1 or more weight percent. Other agents designed to impart specific properties to the final emulsion may be incorporated into the soluble oil compositions such as anti-foam agents, etc.

According to this invention, prior to adding emulsification water to the above-described soluble oil compositions, an augmented blend is first prepared by a method which comprises adding augmentation water be it distilled or hard, and at a temperature of at least about 60° F. In this form, the blend may be stored and/or shipped. It is, afterwards, diluted with from about 10 to 100 or more, preferably about 40 to 60, parts of emulsification water per part by weight of augmented blend to produce a stable emulsion. The optimum level of dilution, of course, will depend on the service requirements of the fluid, the nature of the metal surface being machined, etc.

The invention may be described further with reference to the following specific examples.

The soluble oils, designated as A to D in Table I, had the following compositions:

TABLE I

| | A | B | C | D |
|---|---|---|---|---|
| Composition (Wt. percent): | | | | |
| 55–60 SUS at 100° F. naphthenic oil | | | 12.00 | |
| 100 SUS at 100° F. naphthenic oil | | 82.75 | 29.75 | |
| 300 SUS at 100° F. naphthenic oil | 61.50 | | | 69.82 |
| Tall Oil | | 10.00 | | |
| Sodium mohagany sulfonate, (60%) | | | 28.00 | 18.56 |
| Ammonium mahogany sulfonate, (50%) | 5.50 | | | |
| Butyl Cellosolve | 9.00 | | | |
| Diethylene glycol | | | | 2.18 |
| Hexylene glycol | | 3.00 | 2.00 | |
| Sulfurized mixture of 79.2% lard oil and 8.8% methyl oleate (12% S) | | | 12.50 | |
| Triethanolamine | | | 4.00 | |
| Oxidized petroleum fraction and barium mahogany sulfonate [1] | 15.00 | | | |
| Chlorinated paraffin (40%) | | | 10.00 | |
| Tetrachlorophenol | | | 0.75 | 0.75 |
| Polyethylene glycol 400 monolaurate | | | 1.00 | |
| Water | 5.00 | 2.50 | | 0.94 |
| Sorbitan monooleate | 4.00 | | | |
| KOH (Tech. grade) | | 1.75 | | |
| NaOH (Tech. grade) | | | | 0.40 |
| Lump Rosin | | | | 5.96 |
| Anti-foam agent (calcium soap of sulfated oleic acid) | | | | 1.39 |

[1] A corrosion inhibitor having these tests: Acid number 12.0, Saponification number 31.0 sp. g. 1.022, Flash 410° F.

To the above-described soluble oil compositions augmentation water and emulsification water were sequentially added in the amounts shown in Table II below. The emulsion stability results are also shown in Table II.

TABLE II

| | A | B | C | D |
|---|---|---|---|---|
| Soluble Oil: Concentration, percent | 50 | 50 | 50 | 50. |
| Augmentation Fluid (Distilled Water-ambient temp. 75° F.): Concentration, percent. | 50 | 50 | 50 | 50. |
| Soluble Oil-Augmentation Water Blend Appearance after 24 hours. | Livery emulsion / Tan | Complete emulsion / White | Emulsion gelled / Red Brown | 66% Emulsion. 34% Hazy Oil. |
| Appearance of Emulsion in Various 40° F. Waters at 25 to 1 ratio of Emulsification Water to Blend: | | | | |
| Water No. 1 (125 p.p.m. as CaCO₃)— | | | | |
| Immediately | Perfect | Perfect | Perfect | Perfect. |
| After 24 hours storage | 1 mm. Cream Ring / White | do / White | do / Tan-Brown | Trace Ring. White. |
| Water No. 2 (285 p.p.m. as CaCO₃)— | | | | |
| Immediately | Perfect | Perfect | Perfect | Perfect. |
| After 24 hours storage | 1 mm. Cream Ring / White | do / White | do / Tan-Brown | Do. White. |
| Water No. 3 (325 p.p.m. as CaCO₃)— | | | | |
| Immediately | Perfect | Perfect | Perfect | Perfect. |
| After 24 hours storage | 1 mm. Cream Ring / White | do / White | do / Tan-Brown | Trace Ring. White. |
| Water No. 4 (511 p.p.m. as CaCO₃)— | | | | |
| Immediately | Perfect | Perfect | Perfect | Perfect. |
| After 24 hours storage | 1 mm. Cream Ring / White | do / White | do / Tan-Brown | Do. White. |

All of soluble oils A to D when similarly diluted with the emulsification water but without augmentation water gave unsatisfactory emulsions. Thus the use of the augmentation water overcame the difficulties associated with the use of hard, cold emulsification water.

It is claimed:

1. A method of forming a stable emulsion of a soluble oil consisting essentially of a major amount of mineral lubricating oil, and minor amounts of an oil-soluble emulsifying agent consisting essentially of a member selected from the group consisting of oil-soluble aromatic sulfonates and oil-soluble resinates and of a coupling agent selected from the group consisting of glycols and alkyl ether glycols of up to 12 carbon atoms, and up to about 6% water, the steps which consist essentially of mixing one part of said soluble oil and about 0.4 to 3 parts of augmentation water having up to about 600 p.p.m. hardness as $CaCO_3$ and having a temperature of at least about 60° F. to produce a water-augmented blend, and mixing on part of said blend with about 10 to 100 parts of emulsification water having a temperature up to about 50° F. and having about 100 to 600 p.p.m. hardness as $CaCO_3$, to produce said stable emulsion.

2. The method of claim 1 wherein the oil-soluble aromatic sulfonate is a petroleum mahogany sulfonate of sulfonic acids having an average molecular weight of about 400 to 500.

3. The method of claim 2 wherein the coupling agent is a glycol of up to about 12 carbon atoms.

4. The method of claim 2 wherein the coupling agent is an alkyl ether glycol of up to about 12 carbon atoms.

5. The method of claim 1 wherein the augmentation water has a hardness up to about 300 p.p.m. as $CaCO_3$.

References Cited by the Examiner

UNITED STATES PATENTS

| | | | |
|---|---|---|---|
| 2,890,172 | 6/1959 | Manteuffel et al. | 252—49.5 X |
| 3,033,785 | 5/1962 | Bennett | 252—49.5 X |

DANIEL E. WYMAN, *Primary Examiner.*

P. P. GARVIN, *Assistant Examiner.*